United States Patent
Connolly

(10) Patent No.: US 12,422,219 B2
(45) Date of Patent: Sep. 23, 2025

(54) AUTO LOCKING TURRET

(71) Applicant: Raytheon Canada Limited, Ottawa (CA)

(72) Inventor: John Maxwell Connolly, Seguin (CA)

(73) Assignee: RAYTHEON CANADA LIMITED, Ottawa (CA)

( * ) Notice: Subject to any disclaimer, the term of this patent is extended or adjusted under 35 U.S.C. 154(b) by 145 days.

(21) Appl. No.: 18/448,802

(22) Filed: Aug. 11, 2023

(65) Prior Publication Data

US 2024/0053123 A1    Feb. 15, 2024

Related U.S. Application Data

(60) Provisional application No. 63/397,736, filed on Aug. 12, 2022.

(51) Int. Cl.
| | | |
|---|---|---|
| *F41G 1/18* | (2006.01) | |
| *F41G 1/38* | (2006.01) | |
| *F41G 3/08* | (2006.01) | |

(52) U.S. Cl.
CPC ............. *F41G 1/18* (2013.01); *F41G 1/38* (2013.01); *F41G 3/08* (2013.01)

(58) Field of Classification Search
CPC .............. F41G 1/18; F41G 1/38; F41G 3/08
USPC ............................................... 42/111
See application file for complete search history.

(56) References Cited

U.S. PATENT DOCUMENTS

| | | | |
|---|---|---|---|
| 8,006,429 B2 | 8/2011 | Windauer | |
| 8,490,317 B2 | 7/2013 | Adkins et al. | |
| 9,435,609 B2 * | 9/2016 | Hamilton | F41G 1/38 |
| 10,309,749 B2 * | 6/2019 | Hamilton | F41G 1/38 |
| 10,443,979 B2 | 10/2019 | Sheets, Jr. et al. | |
| 12,001,007 B1 * | 6/2024 | Ding | G02B 23/16 |
| 12,235,076 B2 * | 2/2025 | Davis | F41G 1/38 |
| 2012/0167444 A1 | 7/2012 | Adkins et al. | |
| 2013/0160344 A1 | 6/2013 | Thomas et al. | |
| 2014/0137458 A1 * | 5/2014 | Crispin | G05G 1/10 42/119 |
| 2017/0191797 A1 * | 7/2017 | Lassak | F41G 1/44 |
| 2021/0389553 A1 * | 12/2021 | Campbell | G02B 7/16 |
| 2022/0229281 A1 * | 7/2022 | Sakai | G02B 25/001 |

(Continued)

FOREIGN PATENT DOCUMENTS

DE    202006003770 U1    6/2006

OTHER PUBLICATIONS

International Search Report issued in correspondig PCT application No. PCT/US2023/072112.

*Primary Examiner* — Samir Abdosh
(74) *Attorney, Agent, or Firm* — NORTON ROSE FULBRIGHT CANADA LLP

(57) ABSTRACT

A turret is configured to adjust a position of an alignment stage coupled to the turret. The turret can include an adjustment knob configured to be actuatable in a plurality of adjustment directions to adjust the position of the alignment stage. The turret can further include a lock configured to prevent movement of the adjustment knob in the plurality of adjustment directions. The adjustment knob can be configured to be actuatable to transition the adjustment knob between a locked state in which the lock is engaged and an unlocked state in which the lock is released. With the adjustment knob in the unlocked state, the adjustment knob is actuatable in the plurality of adjustment directions.

17 Claims, 15 Drawing Sheets

(56) References Cited

U.S. PATENT DOCUMENTS

2024/0053123 A1\* 2/2024 Connolly ............... G02B 7/021
2024/0271907 A1\* 8/2024 Enzinger ................ F41G 1/38
2024/0318939 A1\* 9/2024 Lee ........................ F41G 1/24
2025/0012545 A1\* 1/2025 Miu ........................ F41G 1/38
2025/0035914 A1\* 1/2025 Sheets, Jr. .............. G02B 23/16

\* cited by examiner

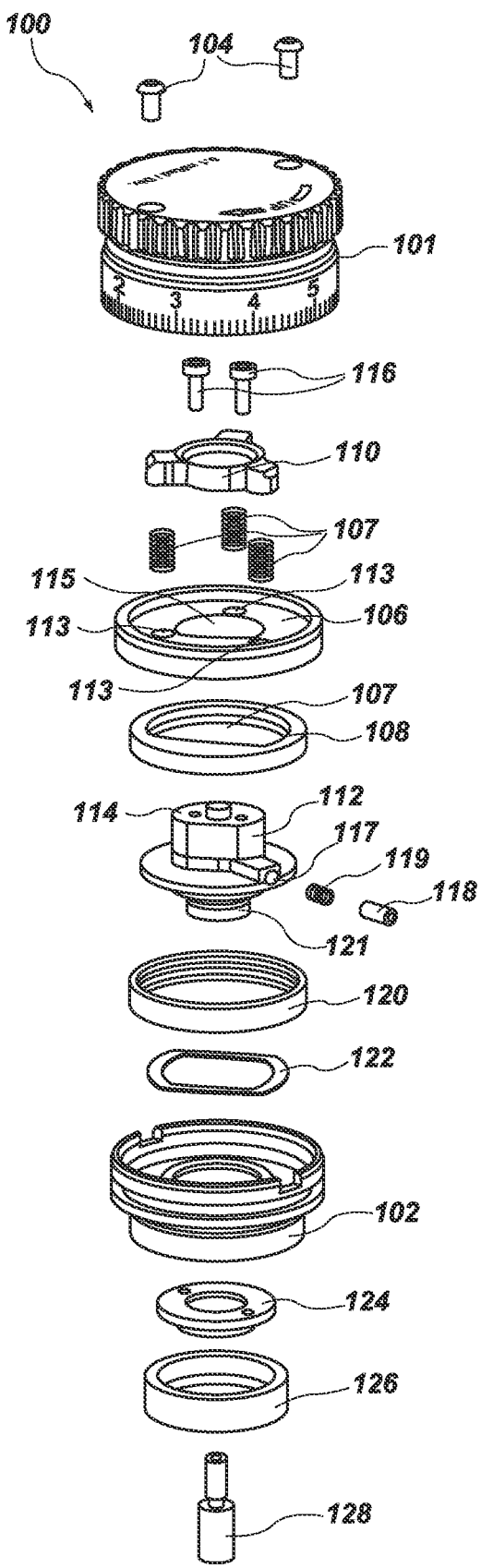
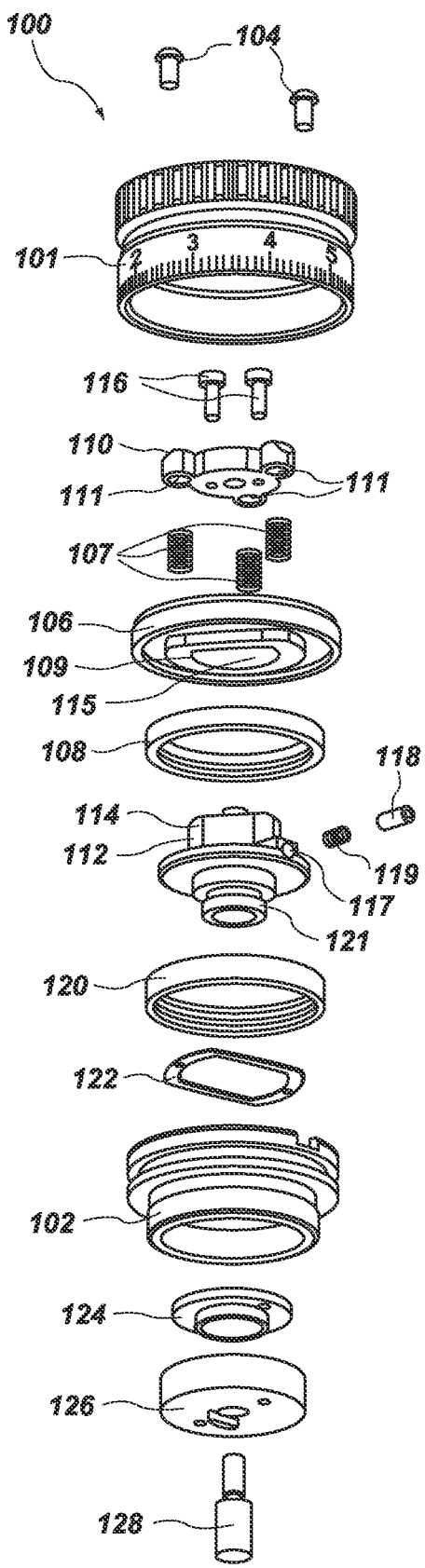
*FIG. 2a*  *FIG. 2b*

600

601: configuring the alignment stage to comprise a turret configured to adjust a position of the alignment stage.

602: configuring the turret to comprise an adjustment knob configured to be actuatable in a plurality of adjustment directions to adjust the position of the alignment stage.

603: configuring the turret to comprise a lock configured to prevent movement of the adjustment knob in the plurality of adjustment directions.

604: facilitating adjustment of the alignment bench by configuring the adjustment knob to be actuatable to transition the adjustment knob between a locked state in which the lock is engaged and an unlocked state in which the lock is released.

605: facilitating adjustment fo the alignment bench by configuring the adjustment knob to be actuatable in the plurality of adjustment directions when the adjustment knob is in the unlocked state.

606: configuring a biasing member to exert a biasing force on the adjustment knob to bias the adjustment knob to the locked state when the adjustment knob is released from the unlocked state.

FIG. 22

AUTO LOCKING TURRET

RELATED APPLICATION

This application claims the benefit of U.S. Provisional Application Ser. No. 63/397,736, filed Aug. 12, 2022, and entitled, "Auto Locking Turret", which is incorporated by reference in its entirety herein.

BACKGROUND

Turrets, such as windage and elevation dials for example, have been in wide use for adjusting sights, scopes, and reticles on firearms. Such turrets typically make adjustments to sights and scopes or components thereof, in up, down, left, right, or other directions to ensure proper sighting of a scope mounted on a firearm or other platform. Zeroing a scope is the act of aligning a point of aim (i.e., where a scope is aiming) and a point of impact (i.e., where a projectile fired from the firearm is impacting a target) of a firearm at a specific distance by actuating the turrets to move the aim of the scope. Aligning the point of aim and the point of impact using the turrets allows a user to fire a shot at a known distance and be able to accurately hit a target at a point that corresponds with where the scope is aiming from the firearm. Once the firearm is zeroed at the specific distance, a user can further adjust each turret in harmony or individually to account for changing conditions of individual shots that may occur at longer or shorter distances, at higher or lower elevations, or with different weather conditions than were present during zeroing of the firearm. Therefore, additional adjustments to the sight/scope may be required using the turrets during aiming and shooting of the firearm after zeroing.

To prevent inadvertent adjustment of turrets caused by accidental bumping of the turrets in the field, conventional turrets are typically provided with screw-on caps that can cover the turret when the turret is not being adjusted in order to ensure that the turret remains at a desired reference position during firing. Alternative turrets utilize separate locking mechanisms allowing the turret to be locked or unlocked by a user. However, in high pressure or time sensitive situations such as combat or hunting, screw-on caps and separate locking mechanisms can hinder a user from properly and quickly adjusting turrets by requiring the user to interact with and perform separate operations (e.g., removing screw-on caps or unlocking the mechanism) with elements other than the turret before being able to adjust the turret. In combat or hunting situations, the extra movements and operations required by separate locking mechanisms or screw-on caps can cost a user valuable time and can also create undesirable movement of the firearm or user that could alert an enemy combatant or animal to the user's position. In order to avoid detection and allow a user to make quick and easy adjustments to a turret, new designs and configurations of turrets are necessary.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIGS. 2a and 2b illustrate exploded views of the turret of FIGS. 1a, 1b, and 1c.

FIG. 22 illustrates a method of position adjustment according to an example of the present disclosure.

Figure 1A:
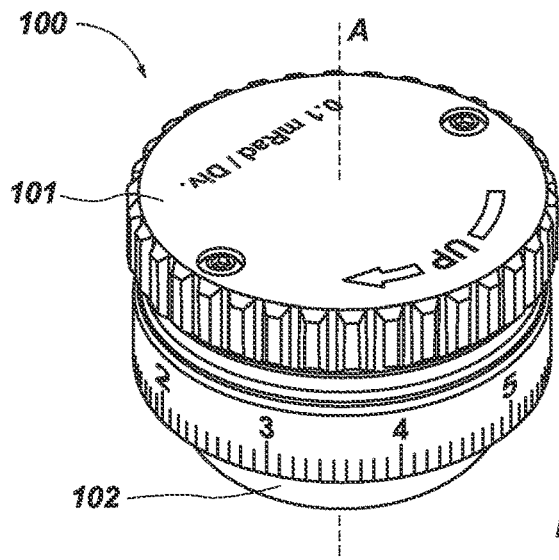
FIGS. 1a, 1b, and 1c respectively, illustrate an isometric view, a top view, and a front view of a turret in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness can in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" can be either abutting or connected. Such elements can also be near or close to each other without necessarily contacting each other. The exact degree of proximity can in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

Disclosed herein is a turret configured to adjust a position of an alignment stage coupled to the turret. The turret can include an adjustment knob configured to be actuatable in a plurality of adjustment directions to adjust the position of the alignment stage. The turret can further include a lock configured to prevent movement of the adjustment knob in the plurality of adjustment directions. The adjustment knob is further configured to be actuatable to transition the adjustment knob between a locked state in which the lock is engaged and an unlocked state in which the lock is released wherein, with the adjustment knob in the unlocked state, the adjustment knob is actuatable in the plurality of adjustment directions.

Further disclosed herein is a position adjustment system. The position adjustment system can include an alignment bench and an adjustable alignment stage configured to adjust a position or aiming of one or more devices mounted to the alignment bench. The position adjustment system can include a turret configured to adjust the alignment stage. The turret can include an adjustment knob configured to be actuatable in a plurality of adjustment directions to adjust the position of the alignment stage. The turret can include a lock configured to prevent movement of the adjustment knob in the plurality of adjustment directions. The adjustment knob can be further configured to be actuatable to transition the adjustment knob between a locked state in which the lock is engaged and an unlocked state in which the lock is released wherein, with the adjustment knob in the unlocked state, the adjustment knob is actuatable in the plurality of adjustment directions.

Herein disclosed is a method of facilitating adjustment of an alignment stage relative to an alignment bench. The method can include a step of configuring the alignment stage to comprise a turret configured to adjust a position of the alignment stage. The method can further include a step of configuring the turret to comprise an adjustment knob configured to be actuatable in a plurality of adjustment directions to adjust the position of the alignment stage. The method can further include a step of configuring the turret to comprise a lock configured to prevent movement of the adjustment knob in the plurality of adjustment directions. The method can further include a step of facilitating adjustment of the alignment stage by configuring the adjustment knob to be actuatable to transition the adjustment knob between a locked state in which the lock is engaged and an unlocked state in which the lock is released. The method can further include a step of facilitating adjustment of the alignment stage by configuring the adjustment knob to be actuatable in the plurality of adjustment directions when the adjustment knob is in the unlocked state.

Figure 1B:
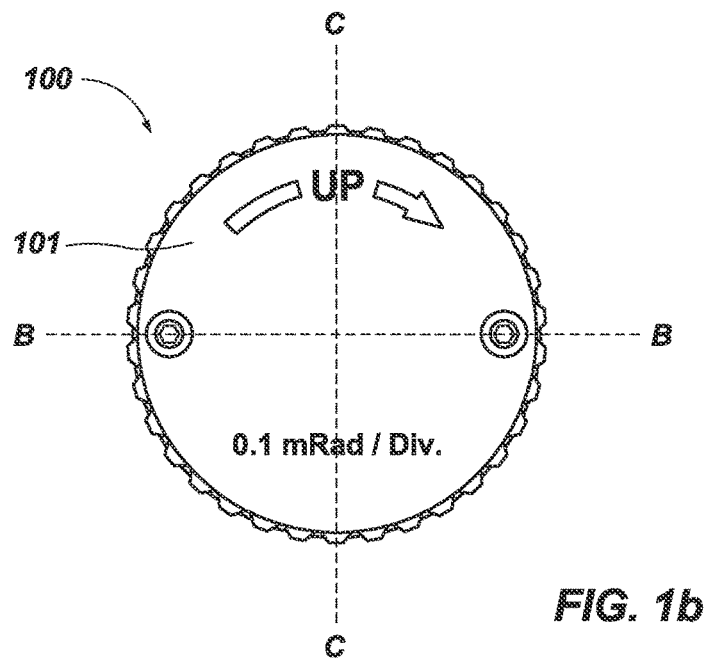
Figure 1C:
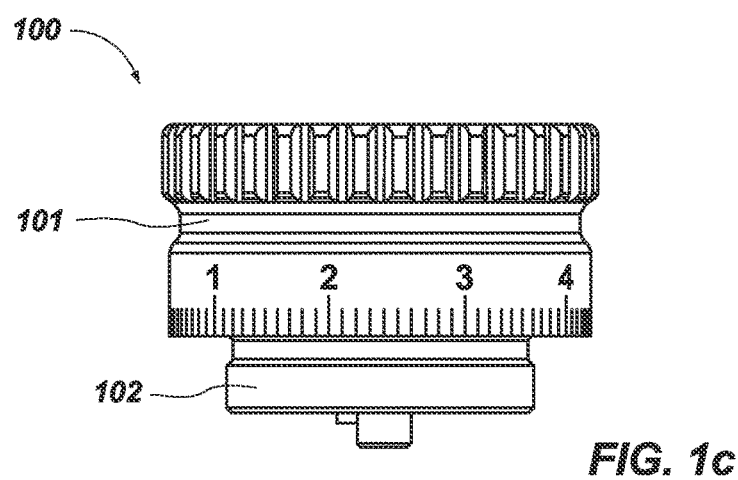

To further describe the present technology, examples are now provided with reference to the figures. With reference to FIGS. 1a, 1b, and 1c, illustrated is a turret 100 in accordance with an example of the present disclosure. The turret 100 can be configured to adjust a position of an alignment stage coupled to the turret 100. The alignment stage, as used herein, can be, for example, an adjustable/moveable element of a scope or sight configured to adjust position or aiming of the scope or sight such as an adjustable platform to which the scope or sight is mounted, an adjustable optical component (e.g., one or more lenses or lens groups, one or more reticles, or any other optical element moveable within or associated with a scope or a sight to adjust the aiming and/or zeroing of the scope or sight) or any other adjustable component that is moveable by a turret. As illustrated in FIGS. 1a and 1c the turret can comprise an adjustment knob 101 configured to be actuatable in a plurality of adjustment directions to adjust the position of an alignment stage. For example, the plurality of adjustment directions can include bi-directional movement in directions clockwise and counterclockwise about an axis A of the turret 100. The adjustment directions can adjust an alignment stage coupled to the turret in any desired direction without limitation. For example, the adjustment directions can move an alignment stage or reticle either up, down, left, right, or any other desired direction.

The turret 100 can further include a lower cover 102 configured to cover inner components of the turret 100 to protect and isolate the inner components of the turret 100 from outside influence, impact, or contamination. The adjustment knob 101 can act as an upper cover configured to protect the inner components of the turret 100 in a manner similar to the lower cover 102. The inner components of the turret 100 will be described in more detail below with reference to other figures.

Each of the components of the turret 100 are illustrated in exploded views shown in FIGS. 2a and 2b. As illustrated, the turret 100 can include the adjustment knob 101 and the lower cover 102. Within the adjustment knob 101 and the lower cover 102, a plurality of inner components can be provided to give functionality to the turret 100. The turret 100 can include a pair of fasteners 104 that fixedly couple the adjustment knob 101 to a spring-loaded plate 106.

However, it is to be understood that the method of coupling the adjustment knob 101 to the spring-loaded plate 106 is not intended to be limited in any way by this disclosure. A locking plate 108 can be fixedly coupled to the spring-loaded plate 106 via a fastener, set screw, machined feature, welding, bonding, adhesive, interference fitting, threading or otherwise. For example, the locking plate 108 can include a D-shaped aperture 107 configured to interface with a D-shaped protrusion 109 on the spring-loaded plate 106 to rotationally and linearly engage the locking plate 108 with the spring-loaded plate 106. However, it is to be understood that the method of coupling the spring-loaded plate 106 to the locking plate 108 is not intended to be limited in anyway by this disclosure.

Accordingly, the adjustment knob 101, the spring-loaded plate 106, and the locking plate 108 can be fixedly coupled together such that any linear or rotational motion of the adjustment knob 101 causes linear or rotational motion of the spring-loaded plate 106 and the locking plate 108. Particularly, linear motion caused by pulling or pushing the adjustment knob 101 along axis A of the knob also causes linear translation of the spring-loaded plate 106, and the locking plate 108. The adjustment knob 101, the spring-loaded plate 106, and the locking plate 108 can herein be collectively be referred to as "linearly actuated components."

The turret 100 can further include "rotationally actuated components" that include the linearly actuated components and additionally include one or more other components that are rotationally engaged with one or more of the linearly actuated components, but that are not linearly actuated along with the linearly actuated components. For example, the turret 100 can further include a spring retainer 110. A plurality of biasing members 107 (e.g., springs) can engage with cavities 111 formed in the spring retainer 110 and cavities 113 formed in the spring-loaded plate 106. The spring-loaded plate 106 can be actuated to move linearly relative to the spring retainer 110 by linear movement of the adjustment knob 101. Movement of the spring-loaded plate 106 relative to the spring retainer 110 can cause the biasing members 107 to compress and provide a biasing force that biases the spring-loaded plate 106 away from the spring retainer 110.

The rotationally actuated components of the turret 100 can further include a plunger support plate 112. The plunger support plate 112 can include a D-shaped protrusion 114 configured to slideably engage with a D-shaped aperture 115 of the spring-loaded plate 106. The spring-loaded plate 106 can slide along the protrusion 114 of the plunger support plate 112 such that the spring-loaded plate can be linearly actuated by linear movement of the adjustment knob 101 without causing linear movement of the plunger support plate 112. The engagement of the protrusion 114 with the aperture 115 will, however, cause rotational movement of the plunger support plate 112 along with rotation of the spring-loaded plate 106 as the adjustment knob 101 is rotated.

A plurality of fasteners 116 can couple the spring retainer 110 to the plunger support plate 112 via corresponding fastener holes formed in each of the spring retainer 110 and the plunger support plate 112. The engagement of the spring retainer 110 with the plunger support plate 112 will cause rotational movement of the spring retainer 110 along with rotation of the plunger support plate 112 caused by rotation of the spring-loaded plate 106 and the adjustment knob 101.

The plunger support plate 112 can have a cavity 117 formed therein configured to receive a plunger 118 having a protrusion configured to interface with detents on a detent ring 120. The plunger 118 can be spring-loaded with a spring 119 disposed in the cavity 117 behind the plunger 118 configured to bias the plunger outward radially from the plunger support plate 112 to bias the plunger 118 to the detent ring 120.

The turret 100 can further comprise a retaining plate 124 configured to couple with a bottom spindle 121 of the plunger support plate 112 to retain lower cover 102 within the adjustment knob 101 and to retain the other components of the turret 100 between the adjustment knob 101 and the lower cover 102. The retaining plate 124 can be coupled to the plunger support plate 112 to rotate along with the plunger support plate 112 when the adjustment knob 101 is rotated.

As described above, the adjustment knob 101, the spring-loaded plate 106, and the locking plate 108 can herein be collectively be referred to as "linearly actuated components." The "rotationally actuated components" can include the adjustment knob 101, the spring retainer 110, the biasing members 107, the spring mounted plate 106, the fasteners 116, the locking plate 108, the plunger support plate 112, and the retaining plate 124. The "rotationally actuated components" as described herein are components that are rotationally moved when rotational actuation of the adjustment knob 101 is performed. Although all of the "linearly actuated components" are also rotationally actuatable, not all of the "rotationally actuated components" are able to be linearly actuated.

The turret 100 can further include "stationary components" that are configured to not move linearly or rotationally when the adjustment knob 101 is actuated either linearly or rotationally. In other words, the stationary components remain static when the adjustment knob 101 is moved. The stationary components can include the lower cover 102. Additionally, a biasing member 122 (e.g., a leaf spring, a wave spring, and/or a wave washer) can be configured to rest on the lower cover 102 and to urge the plunger support plate away from the lower cover 102 and toward the spring retainer 110. The biasing member 122 operates to remove any undesirable movement or play between components to give a user a better feeling and more sturdy operation when operating the turret 100.

Figure 3:
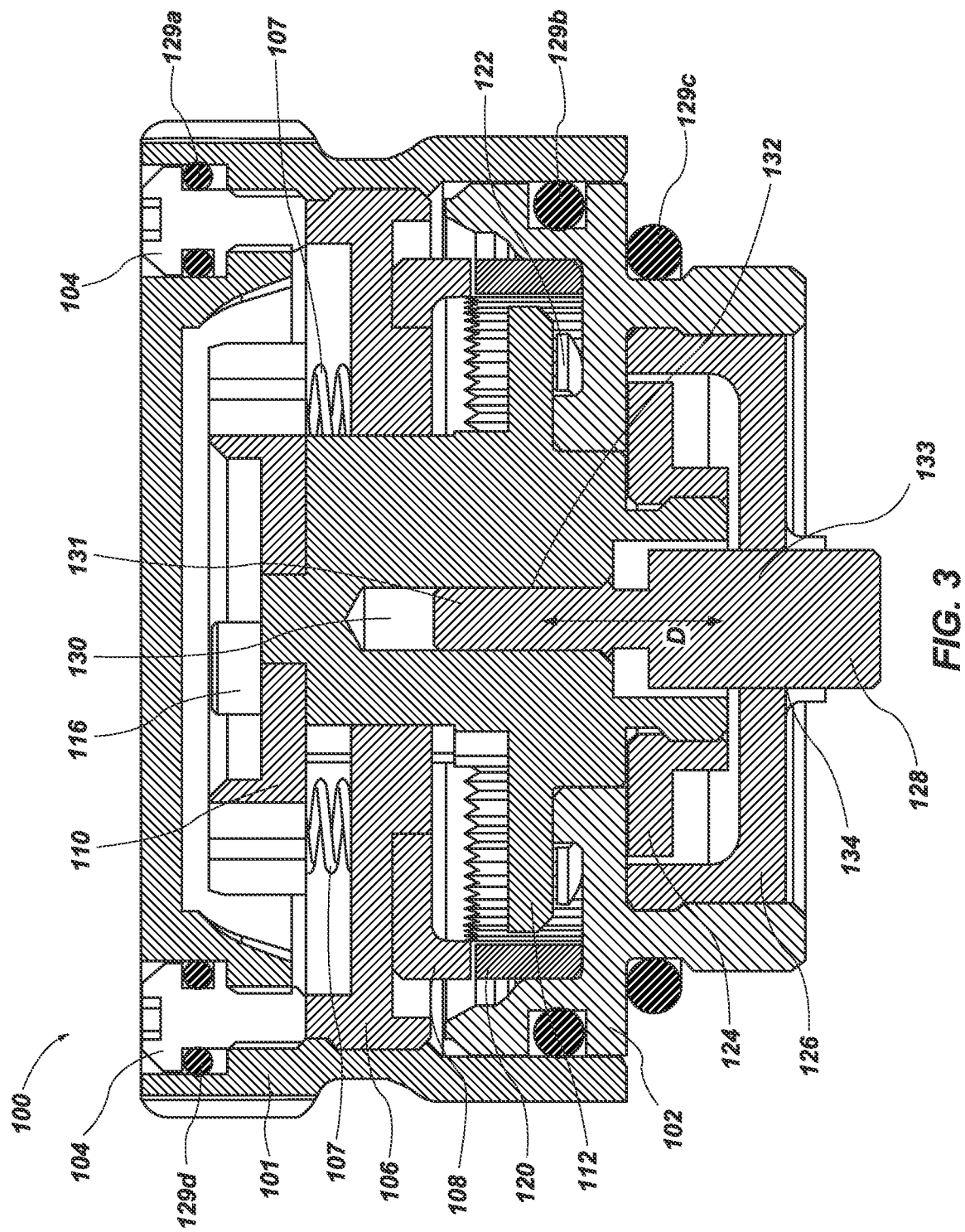
FIG. 3, illustrates a cross-sectional view of the turret of FIG. 1B taken along line BB.

A detent ring 120 can be fixedly coupled to the lower cover 102 by any suitable method without limitation. The detent ring 120 being fixedly coupled to the lower cover 102 can be configured to remain stationary with the lower cover 102 during linear or rotational actuation of the adjustment knob 101. A lower ring 126 can further be fixedly coupled to an opposite side of the lower cover 102 than the detent ring 120. The lower ring 126 can be configured to cover the retaining plate 124. The lower ring 126 can be further configured to slideably engage with a contact pin 128 that interfaces with an alignment stage and imparts motion to the alignment stage as a result of rotational actuation of the adjustment knob 101 of the turret 100. Further function of the contact pin 128 will be described further below in this disclosure. A plurality of O-rings 129a, 129b, 129c, and 129d can be included between the fasteners 104 and the adjustment knob 101, between the lower cover 102 and the adjustment knob 101, and outside of the lower cover 102 as illustrated in FIG. 3. As shown in FIG. 3, the O-rings 129a and 129d can be the same as each other.

As described above, during linear actuation of the adjustment knob 101, the linearly actuatable components can move linearly in response to the linear actuation while both the rotationally actuated components and the stationary components remain in place. During rotational actuation of the adjustment knob 101, the rotationally actuated components, which includes certain of the linearly actuatable components, can rotate in response to the rotation of the adjustment knob 101 while the stationary components remain in place. During both rotational and linear actuation of the adjustment knob 101, the stationary components remain stationary.

Figure 4:
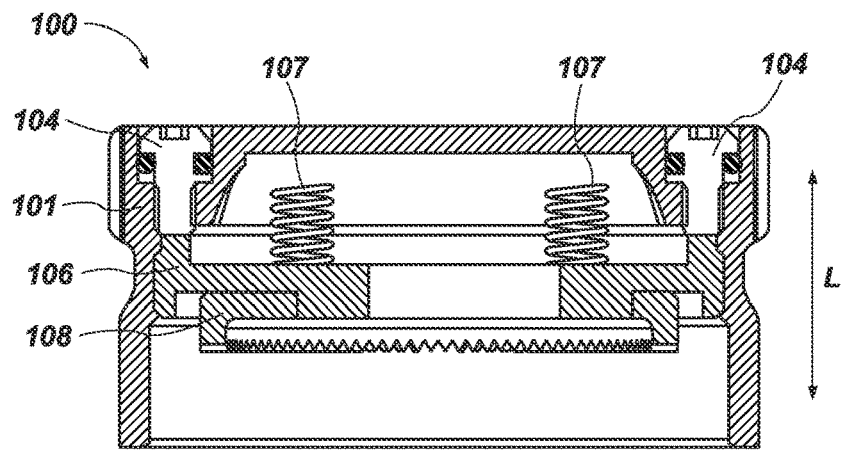
FIG. 4, illustrates a cross-sectional view of the turret of FIG. 1B taken along line BB showing linearly actuated components of the turret.
Figure 5:
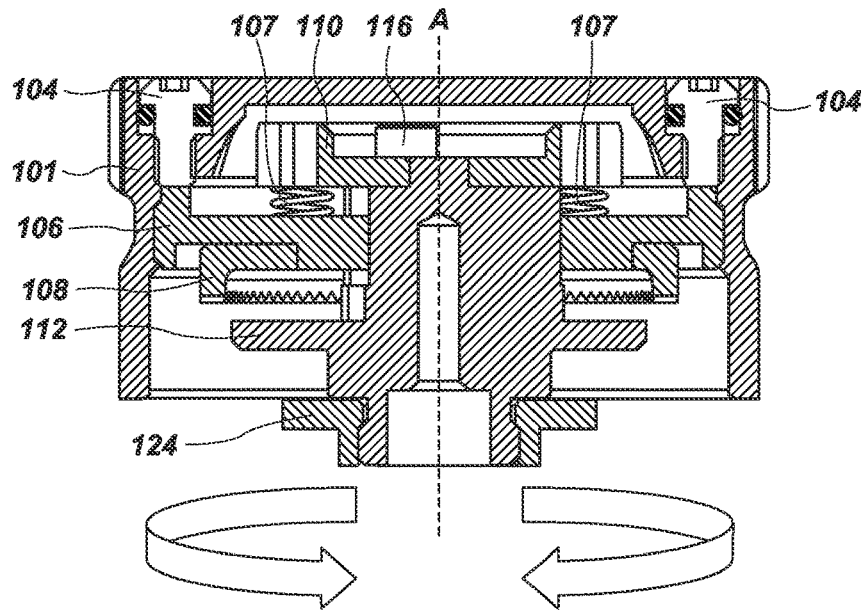
FIG. 5, illustrates a cross-sectional view of the turret of FIG. 1B taken along line BB showing rotationally actuated components of the turret.
Figure 6:
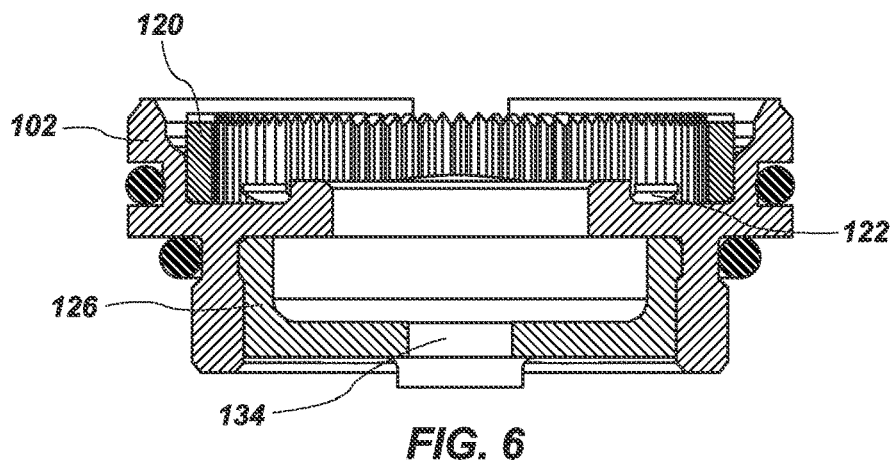
FIG. 6, illustrates a cross-sectional view of the turret of FIG. 1b taken along line BB showing stationary components of the turret.

FIG. 3 illustrates a cross-section of the turret 100 taken along line BB shown in FIG. 1B. Each of the previously described components of the turret 100 are identified in the cross-sectional view of FIG. 3 in an assembled configuration. FIG. 4 illustrates the same cross-sectional view of the turret 100 shown in FIG. 3, however, all components except the linearly actuatable components have been removed in order to show components subject to linear motion by linear actuation L of the adjustable knob 101. FIG. 5 illustrates the same cross-sectional view of the turret 100 shown in FIG. 3, however, all components except the rotationally actuatable components have been removed in order to show components subject to rotational motion by rotational actuation about axis A of the adjustable knob 101. FIG. 6 illustrates the same cross-sectional view of the turret 100 shown in FIG. 3, however, all components except the stationary components have been removed in order to show components that are not subject to motion by either linear or rotational actuation of the adjustable knob 101.

Figure 7:
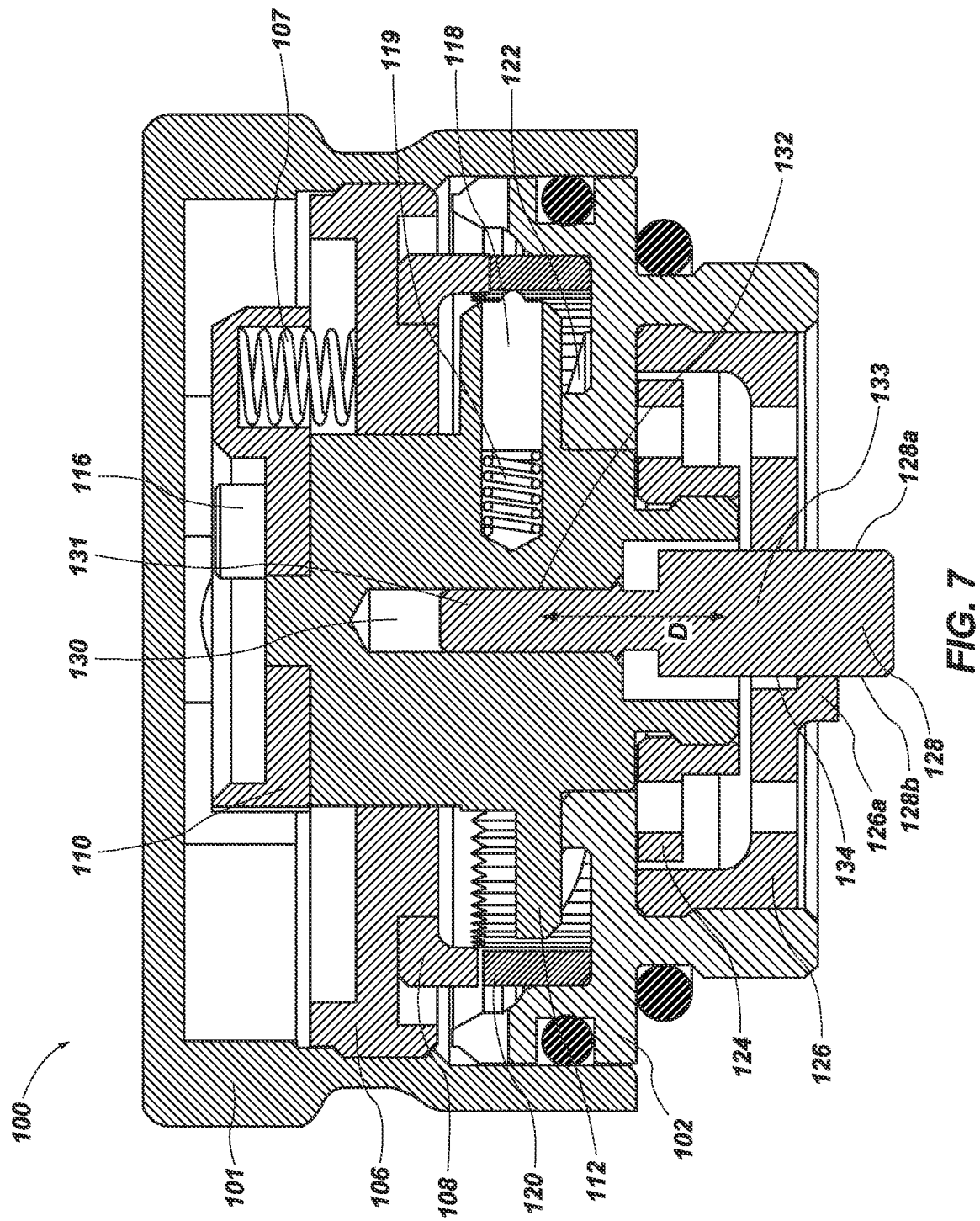
FIG. 7, illustrates a cross-sectional view of the turret of FIG. 1b taken along line CC.
Figure 8:
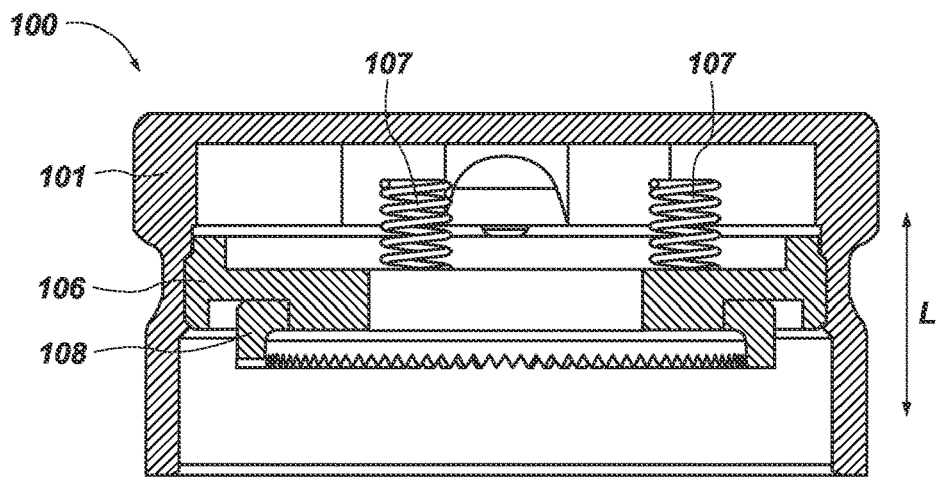
FIG. 8, illustrates a cross-sectional view of the turret of FIG. 1b taken along line CC showing linearly actuated components of the turret.
Figure 9:
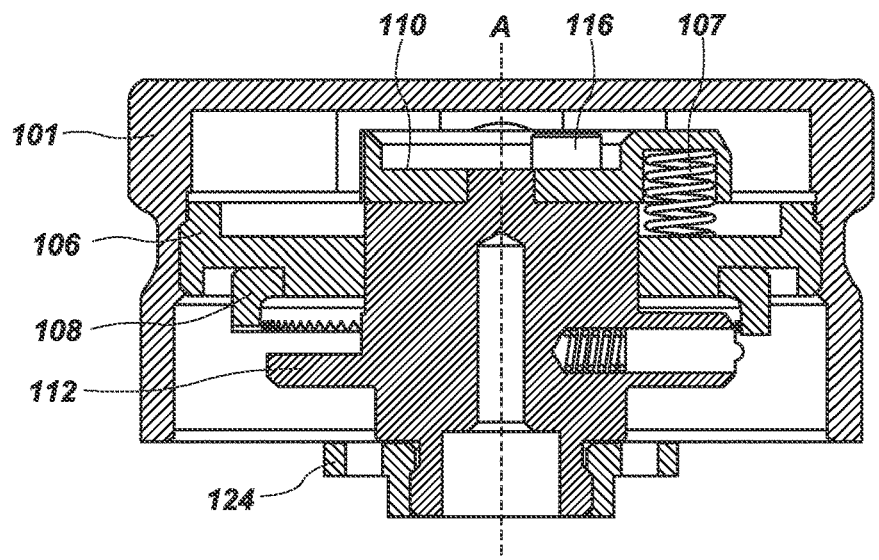
FIG. 9, illustrates a cross-sectional view of the turret of FIG. 1b taken along line CC showing rotationally actuated components of the turret.
Figure 10:
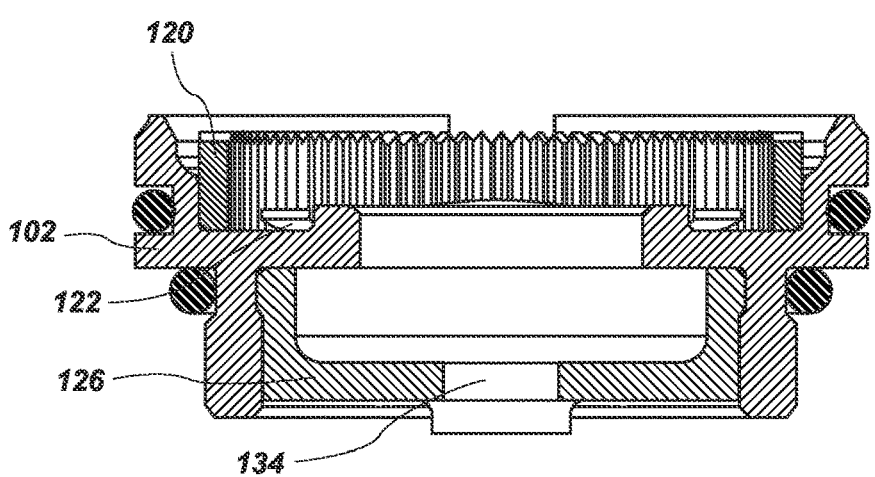
FIG. 10, illustrates a cross-sectional view of the turret of FIG. 1b taken along line CC showing stationary components of the turret.

FIG. 7 illustrates a cross-section of the turret 100 taken along line CC shown in FIG. 1B. Each of the previously described components of the turret 100 are identified in the cross-sectional view of FIG. 7 in an assembled configuration. FIG. 8 illustrates the same cross-sectional view of the turret 100 shown in FIG. 7, however, all components except the linearly actuatable components have been removed in order to show components subject to linear motion by linear actuation L of the adjustable knob 101. FIG. 9 illustrates the same cross-sectional view of the turret 100 shown in FIG. 7, however, all components except the rotationally actuatable components have been removed in order to show components subject to rotational motion by rotational actuation about axis A of the adjustable knob 101. FIG. 10 illustrates the same cross-sectional view of the turret 100 shown in FIG. 7, however, all components except the stationary components have been removed in order to show components that are not subject to motion by either linear or rotational actuation of the adjustable knob 101.

The contact pin 128 is configured to move with a functionality different from the linearly actuated components and/or the rotationally actuated components. For example, FIGS. 3 and 7 illustrate cross-sectional views of the turret 100 taken respectively along line BB and line CC as shown in FIG. 1b. As shown in FIGS. 3 and 7, the contact pin 128 can include a threaded portion 131 that interfaces with a cavity 130 defined by the plunger support plate 112. Although the threads are not illustrated in the drawing, it is to be understood that the contact pin 128 and the cavity 130 include threads therein. Accordingly, the contact pin 128 is threadably engaged with a surface 132 of the cavity 130 having threads formed thereon which correspond to threads formed on the contact pin 128.

Figure 11:
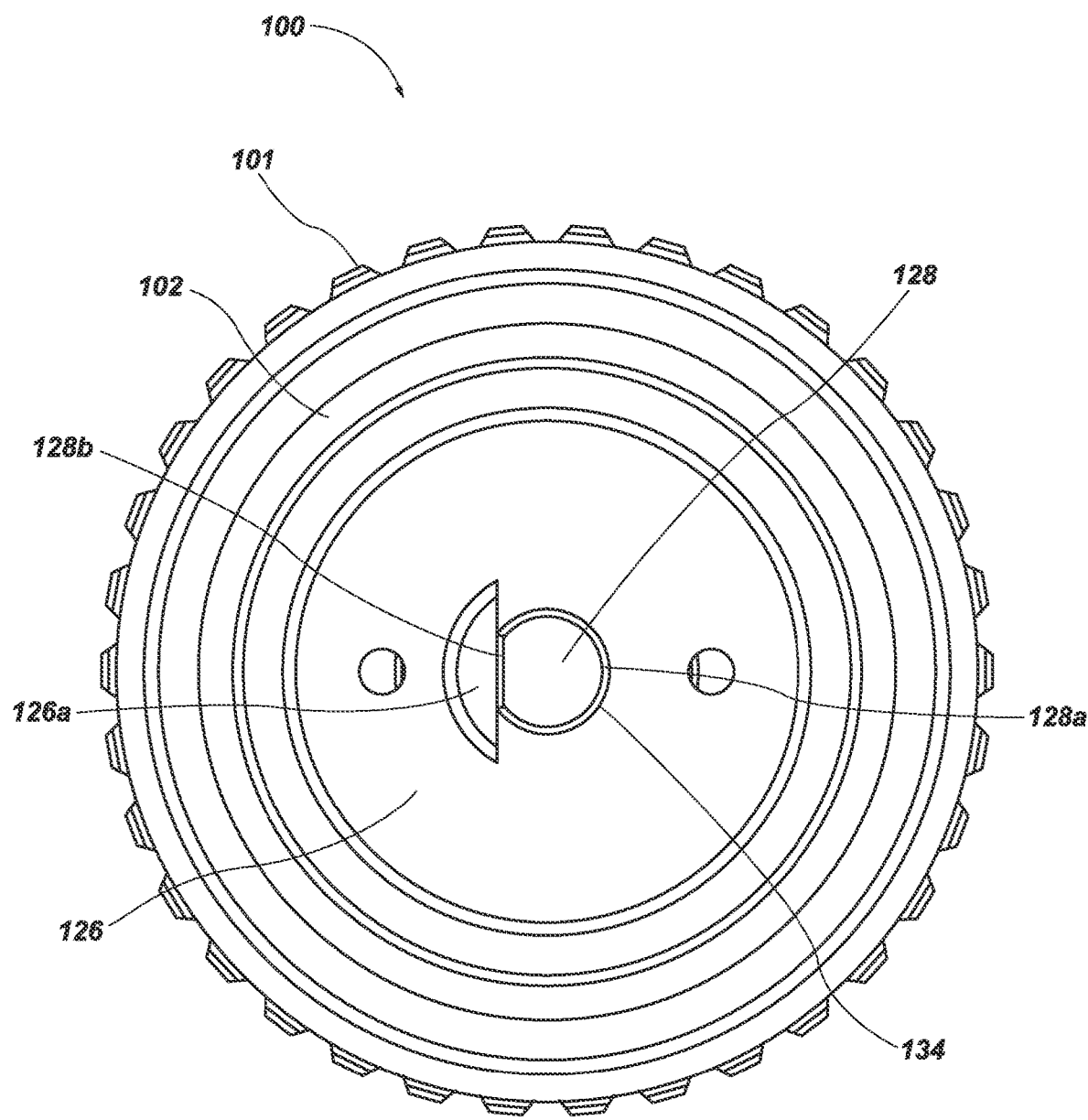
FIG. 11 illustrates a bottom view of the turret of FIGS. 1a, 1b, and 1c.

A base 133 of the contact pin 128 is slideably engaged with the lower ring 126 of the turret 100. As illustrated in FIGS. 3, 6, 7, 10, and 11, the lower ring 126 can include an aperture 134 configured to receive the base 133 of the contact pin 128. The contact pin 128 is configured to be slideable within the aperture 134 such that the contact pin 128 can move upward and downward in directions D along the axis A of the turret 100 within the aperture 134. To ensure that the contact pin 128 does not rotate with rotation of the plunger support plate 112, the aperture 134 can be substantially D-shaped, or can be any shape to allow slideable engagement between the contact pin 128 and the lower ring 126. The D-shape of the aperture is illustrated in FIG. 11, which is a bottom view of the turret 100. To correspond to the D-shape of the aperture 134, the contact pin 128 can have a substantial D-shape as shown in FIG. 11. The D-shape of the contact pin 128 can comprise a rounded surface portion 128a and a flat surface portion 128b. The lower ring 126 can further include a protrusion 126a positioned adjacent to the aperture 134 having a flat surface to engage with the flat surface portion 128b of the contact pin 128. It is to be understood that the aperture need not be D-shaped as long as one or more of the aperture 134 or the protrusion 126a are shaped to engage with the contact pin 128 in such a way that rotation of the contact pin 128 is prevented while still allowing linear movement of the contact pin 128.

By engagement of the protrusion 126a with the flat portion 128b of the contact pin 128, the contact pin 128 is prevented from rotating as the rotationally actuated components are rotated via the rotation of the adjustment knob 101. However, the contact pin is allowed to move linearly along direction D. As the rotationally actuated components are rotated, particularly including the plunger support plate 112, the threads of the threaded portion 131 of the contact pin 128 interface with the threads of the cavity 130 such that the contact pin 128 is moved further into or out of the cavity 130. Accordingly, by rotational motion of the plunger support plate 112, the contact pin 128 is moved in a linear direction.

The contact pin 128 can interface with an adjustable alignment stage configured to move in a direction corresponding to movement of the contact pin 128. Thereby, adjustments in position of an alignment stage can be carried out by rotation of the adjustment knob 101, which causes rotation of the plunger support plate 112, which in turn causes linear motion of the contact pin 128. The contact pin 128 can either directly or indirectly interface with the adjustable alignment stage. As such, the motion of the contact pin 128 can impart motion on the alignment stage to adjust the position of the alignment stage. Both windage and elevation turrets can be provided for an alignment stage to adjust windage and elevation of an alignment stage mounted to a firearm and having an aiming scope mounted thereto. Thereby, the scope of the firearm can be zeroed and adjusted to ensure that a firearm is properly aimed and calibrated for accurate shooting.

The alignment stage is not limited to being on a firearm, or that configured for a firearm. The firearm is merely one example of an alignment bench that can be used as a stationary platform or device in support of an adjustable alignment stage configured to be adjusted by a turret. The turret technology described herein can be used for additional applications, namely for any type of table or bench that is intended to be adjustable. For example, and not intending to be limiting in any way, the turrets can interface with a stage on a microscope to adjust a microscope stage. Alternatively, a table top, a tooling surface, or any other adjustable element where a position is to be adjusted can interface with turrets as disclosed herein to provide auto-locking turrets with precise adjustment.

As described above, the turret 100 described herein can include an auto-locking feature without the need of a separate locking mechanism or screw-on cap to protect the turret from unintentional adjustment due to bumping of the turret. For example, the turret 100 described herein can be configured to adjust a position of an alignment stage coupled to the turret 100 and the turret 100 can include the adjustment knob 101 configured to be actuatable in a plurality of adjustment directions to adjust the position of the alignment stage. The turret can further include a lock configured to prevent movement of the adjustment knob in the plurality of adjustment directions.

Figure 12:
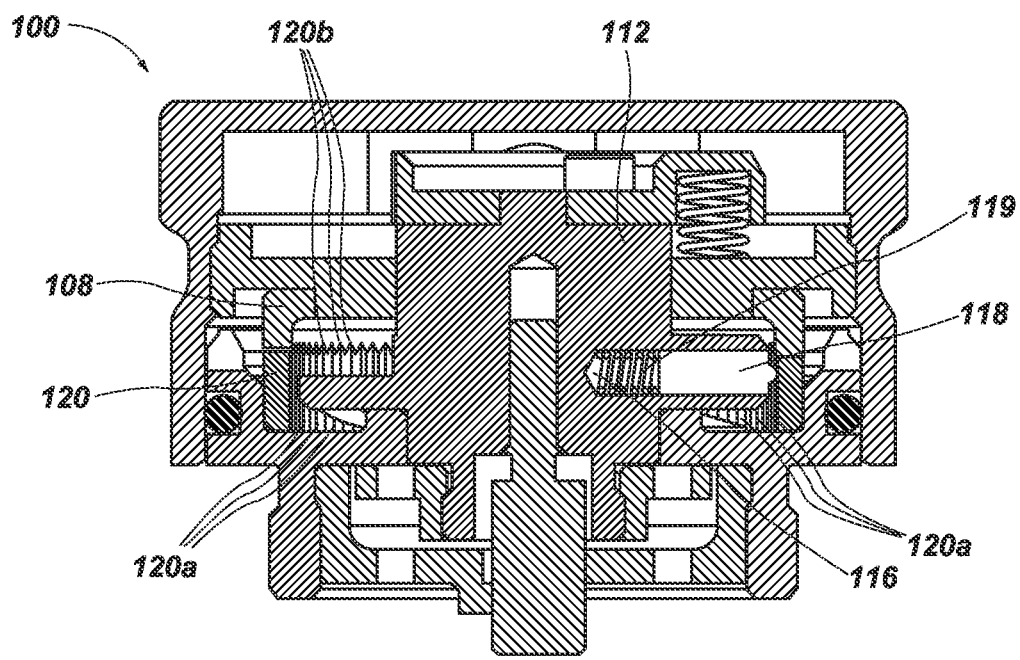
FIG. 12 illustrates a cross sectional view of the turret of FIGS. 1a, 1b, and 1c in a locked state.
Figure 13:
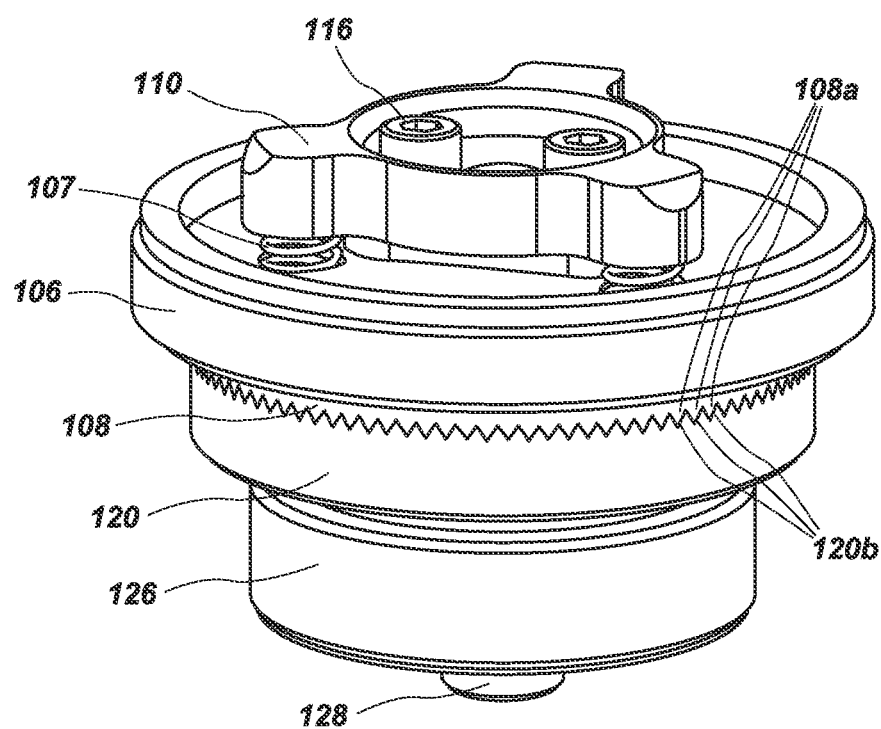
FIG. 13 illustrates a perspective view of the turret of FIGS. 1a, 1b, and 1c in a locked state.
Figure 16:
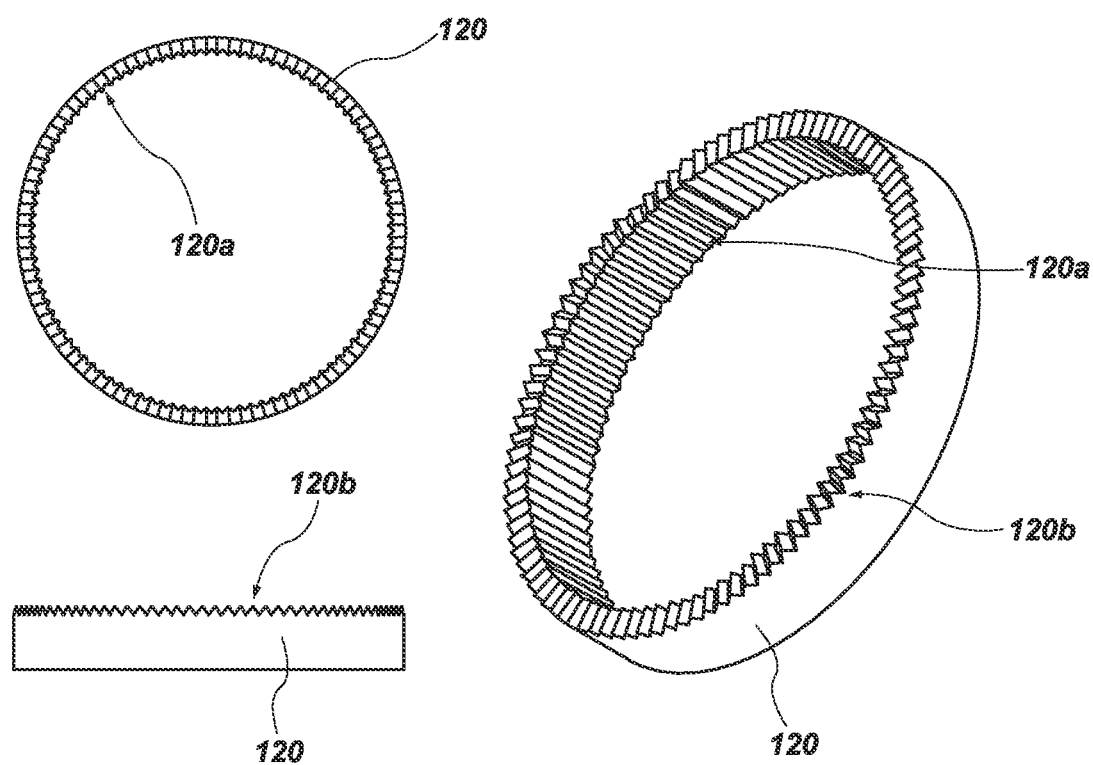
FIG. 16 illustrates various views of a detent ring according to an example of the present disclosure.

FIGS. 12 and 13 illustrate the turret 100 and adjustment knob 101 in a locked state in which the lock is engaged. The lock can include at least the locking plate 108 of the rotationally actuated components of the turret 100 and the detent ring 120 of the stationary components of the turret 100. As shown, the detent ring 120 can include a plurality of positioning detents 120a formed on an inner radial surface thereof. The spring-loaded detent plunger 118 disposed in cavity 117 is spring-loaded with spring 119 to be biased toward the positioning detents 120a of the detent ring 120 surrounding the plunger support plate 112. The detent plunger 118 is configured to engage with one of the plurality of positioning detents 120a to provide indexed and clocked positions for precise adjustment of the turret 100 during adjustment. The detent ring 120 can further include a plurality of locking detents 120*b* formed on a surface of the detent ring that is different than the inner radial surface where the positioning detents 120*a* are formed. FIG. 16 illustrates various views of the detent ring 120 and illustrates locations of the locking detents 120*b* and the positioning detents 120*a* on the detent ring 120. As shown in the figures, in the locked state, the detent plunger 118 is engaged with the one or more of the plurality of positioning detents 120*a* and the one or more protrusions or teeth 108*a* are engaged with the plurality of locking detents 120*b*.

The locking plate 108 can include a plurality of locking teeth 108*a* configured to engage with the locking detents 120*b* of the detent ring 120 to lock the turret 100/adjustable knob 101 in place to prevent motion of the adjustable knob 101. As described above, the locking plate 108 is one of the rotationally actuated components of the turret 100 and the detent ring 120 is one of the stationary components of the turret 100 accordingly, when the teeth 108*a* of the locking plate 108 are engaged with the locking detents 120*b* of the stationary detent ring 120, the locking plate 108, along with all other rotationally actuated components of the turret 100 are locked in place and prevented from rotating.

The adjustment knob 101 can be configured to be actuatable to transition the adjustment knob 101 between a locked state (shown in FIGS. 12 and 13) in which the lock (e.g., locking plate 108 and detent ring 120) is engaged, and an unlocked state (shown in FIGS. 14 and 15) in which the lock (e.g., locking plate 108 and detent ring 120) is released.

Figure 14:
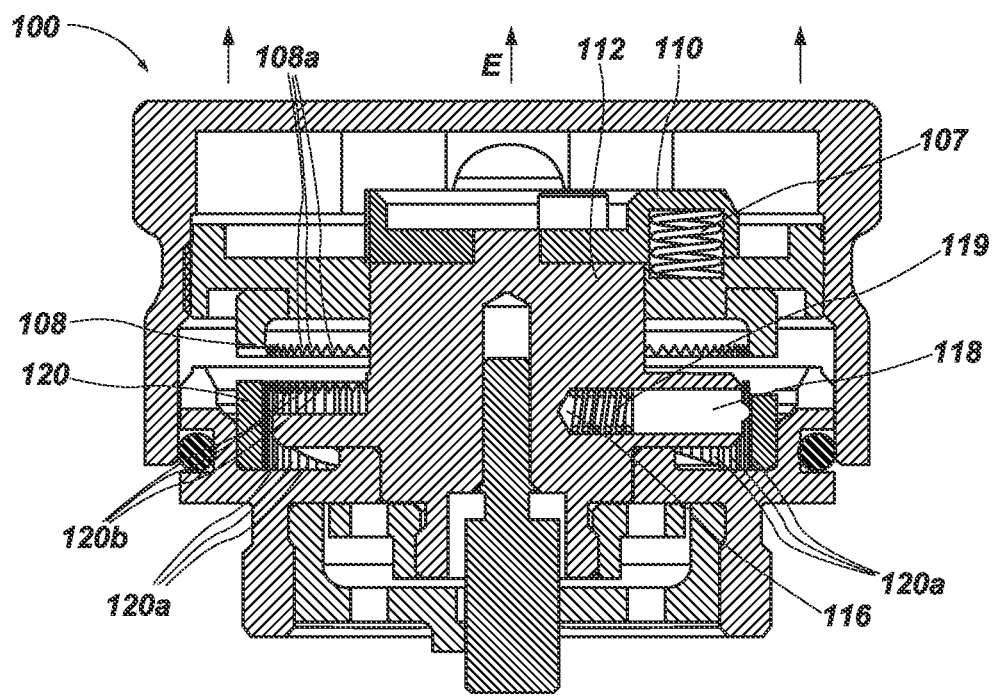
FIG. 14 illustrates a cross sectional view of the turret of FIGS. 1a, 1b, and 1c in an unlocked state.
Figure 15:
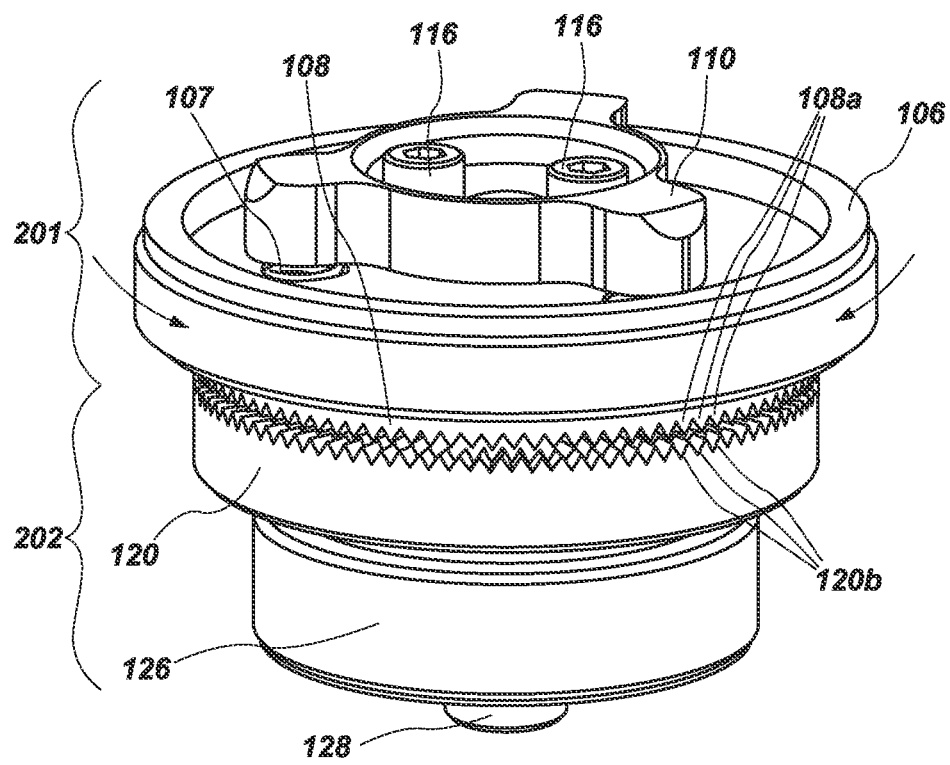
FIG. 15 illustrates a perspective view of the turret of FIGS. 1a, 1b, and 1c in an unlocked state.
Figure 17:
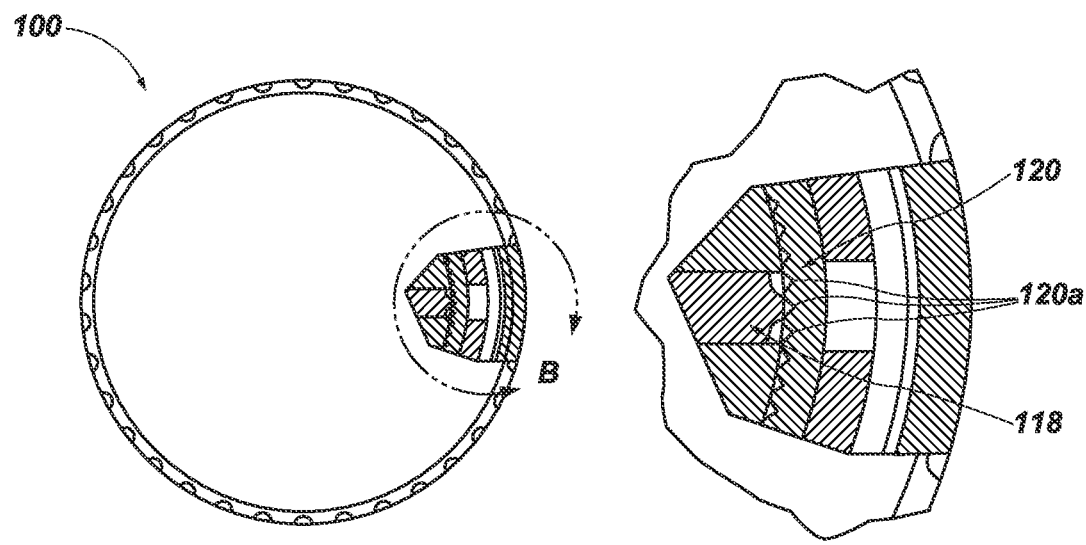
FIG. 17 illustrates a top and cutaway view of the turret of FIGS. 1a, 1b, and 1c.
Figure 18:
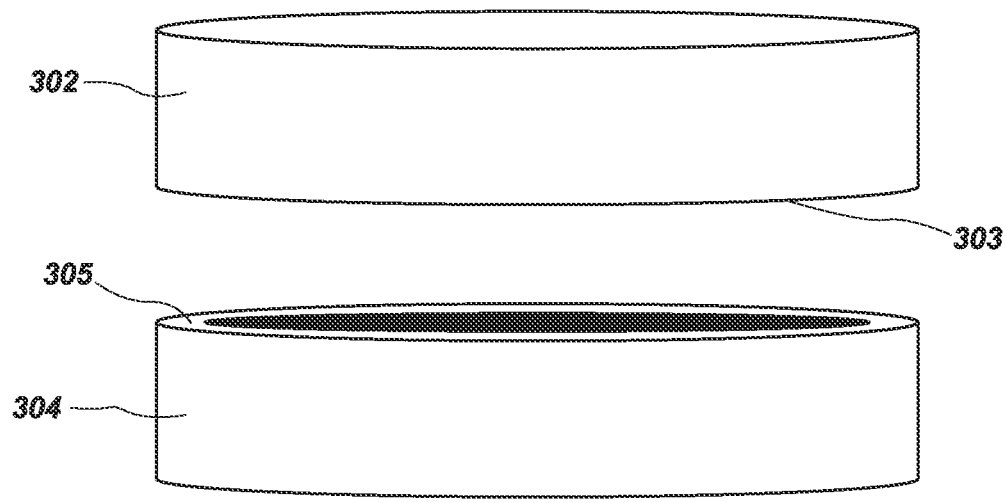
FIG. 18 illustrates a locking plate and braking ring according to an example of the present disclosure.

As shown in FIGS. 14 and 15, to release the lock, the adjustment knob 101 can be pulled linearly upward in a direction E along the axis of the turret 100. When the adjustment knob 101 is actuated linearly, the other linearly actuated components (shown in FIGS. 4 and 8) of the turret 100 are also linearly actuated upward in the same motion as the adjustment knob 101. FIGS. 14 and 15 illustrate the turret 100/adjustment knob 101 in the unlocked state. As shown, the teeth 108*a* of the locking plate 108 are separated from the locking detents 120*b* of the detent ring 120 in the unlocked state of the turret 100. With the teeth 108*a* disengaged from the locking detents 120*b*, the rotationally actuated components (shown in FIGS. 5 and 9) are free to rotate by rotation of the adjustable knob 101. With the adjustment knob 101 in the unlocked state, the adjustment knob 101 is actuatable in the plurality of adjustment directions to rotate the detent plunger 118 sequentially through each of the positioning detents 120*a* of the detent ring to provide precision positioning and adjustment of the adjustment knob 101 and the turret 100. FIG. 17 illustrates a top view of the turret 100 and a cutaway internal view showing the plunger 118 engaged with positioning detents 120*a* of the detent ring 120. In FIG. 15, an upper portion 201 of the turret 100 is identified along with a lower portion 202 of the turret 100. In the unlocked state, the upper portion 201 is rotatable relative to the lower portion 202 to perform adjustment of the turret 100 causing the plunger 118 to rotate through the positioning detents 120*a*. Furthermore, in the unlocked state, the detent plunger 118 is engaged with the one or more of the plurality of positioning detents 120*a* and the one or more protrusions or teeth 108*a* are disengaged with the plurality of locking detents 102*b*, thereby allowing movement of the adjustment knob 101.

The biasing members 107 of the turret 100 can be configured to exert a biasing force on the adjustment knob 101 (via the spring-loaded plate 106) to bias the adjustment knob 101 and the other linearly actuated components to the locked state. As shown in FIGS. 14 and 15, the biasing members 107 become compressed between the spring-loaded plate 106 and the spring retainer 110 when the adjustment knob 101 is linearly actuated in direction E. The biasing force exerted by the biasing members 107 on the spring-loaded plate 106 bias the locking plate 108 toward the detent ring 120. Accordingly, a user may unlock the turret 100/adjustment knob 101 by simply lifting up on the adjustment knob 101, in which state the adjustment knob is rotatable to adjust the positioning of the turret 100 and adjustment of the alignment stage. When the user is done making adjustments, the user may simply let go and release the adjustment knob 101, at which point the biasing members 107 automatically snap the adjustment knob 101 and locking plate 108 back into the locked state, thereby preventing accidental movement or adjustment of the turret 100 when the adjustment knob is released from the unlocked state.

According to the described configuration of the turret 100, several advantages are obtained over the related art. For example, a user can lock, unlock, and adjust the turret 100 by actuation of one mechanism (e.g., the adjustment knob 101). A user simply actuates the knob 101 linearly to unlock the turret 100/knob 101 and actuates the knob 101 rotationally to adjust positioning of the turret 101. After the positioning has been adjusted, another linear actuation of the knob 101 moves the knob 101 back into the locked state, thereby preventing the knob 101 from undergoing further adjustments when adjustments are not desired by the user. The linear actuation of the knob 101 back to the locked state, as described herein, can be accomplished without the user actuating the knob 101. Instead, biasing members 107 can make the actuation of the knob 101 to the locked state automatic once the user releases the knob 101. Accordingly, a simple motion of a single mechanism accomplishes adjustment of the turret 100 and locking/unlocking of the turret 100 to allow intentional adjustment while also preventing unintentional adjustment of the turret 100. In contrast, the related art requires actuation of separate mechanisms (e.g., separate locking mechanisms or screw-on caps) other than the turret 100 in order allow adjustment and locking of a turret. The separate mechanisms of the related art requires a user to actuate multiple mechanisms in multiple ways in order to perform adjustment and locking/unlocking of the turret. This can cause the user to waste, use, and/or spend vital time and energy that could undesirably alert others during adjustment in situations where time and stealth are critical to a user accomplishing objectives.

Additional variations of the examples described above are contemplated within the scope of this disclosure. For example, the detent ring and the locking plate may be designed without detents or teeth to lock the detent ring and the locking plate together. The turret 100 can instead comprise a stationary portion (e.g., detent ring 120) configured to remain stationary during actuation of the adjustment knob 101 and a rotatable portion such as the adjustment knob 101 (e.g., the locking plate 108 coupled to the adjustment knob 101). The locking plate 302 can include a braking surface 303 that engages with a brake 305 on a braking ring 304 to prevent movement of the braking ring 304 relative to the locking plate 302. The brake can comprise any compliant or braking-type/friction-inducing material utilized for creating a braking force between the locking plate 302 and the braking ring 304 by engagement of the braking surface 303 with the brake 305. The brake 305 and/or braking surface can be comprised of the same material, can be doped with a friction-inducing material, or can be coated in a friction-inducing material to provide the adequate braking force to prevent rotation of the braking ring 304 relative to the locking ring 302. Either of the locking ring 302 or the braking ring 304 can include the brake or the braking surface as long as the braking force produced is sufficient to prevent rotation by accidental bumping of the turret.

Figure 19:
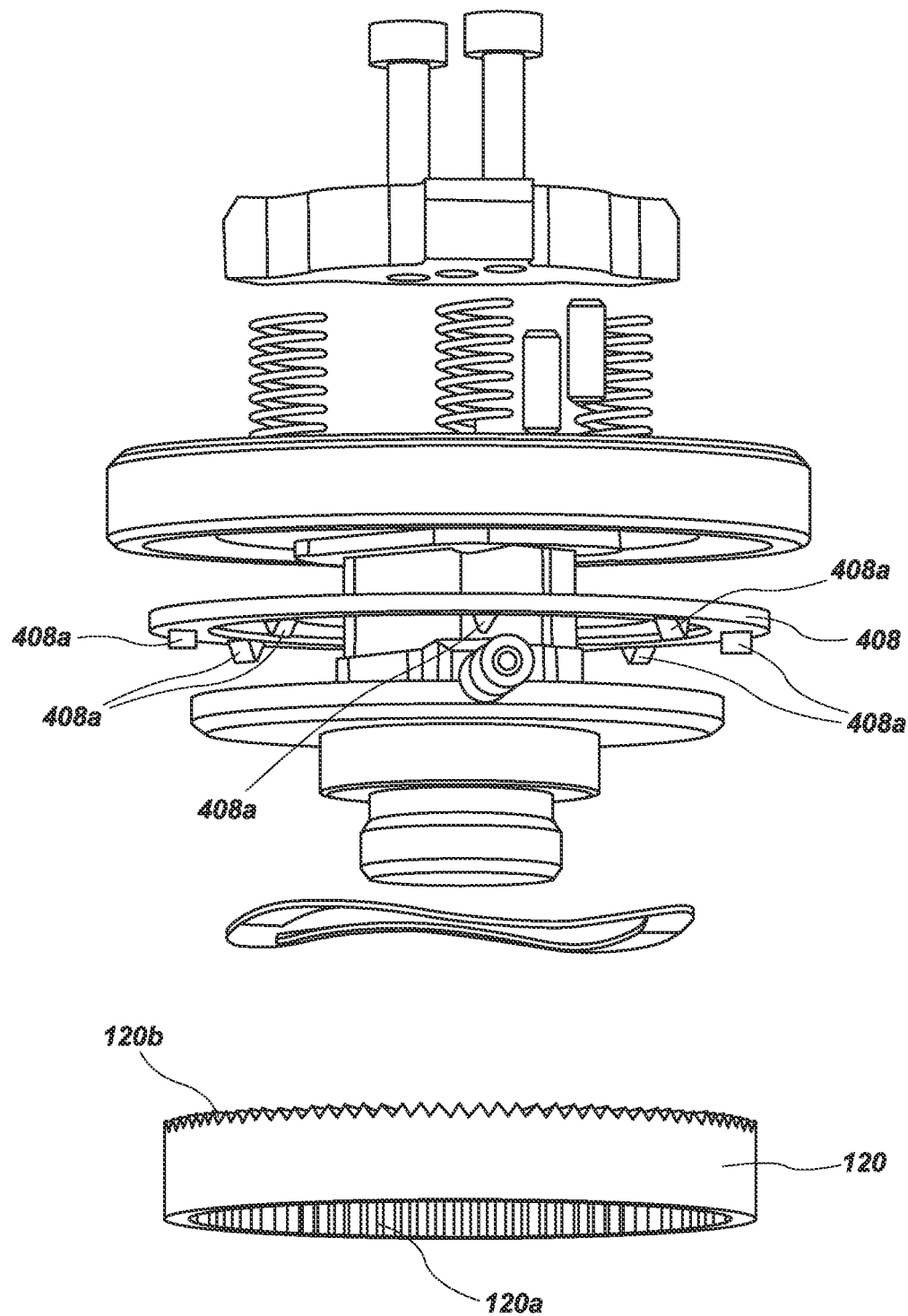
FIG. 19 illustrates an exploded view of an alternative turret according to an example of the present disclosure.
Figure 20:
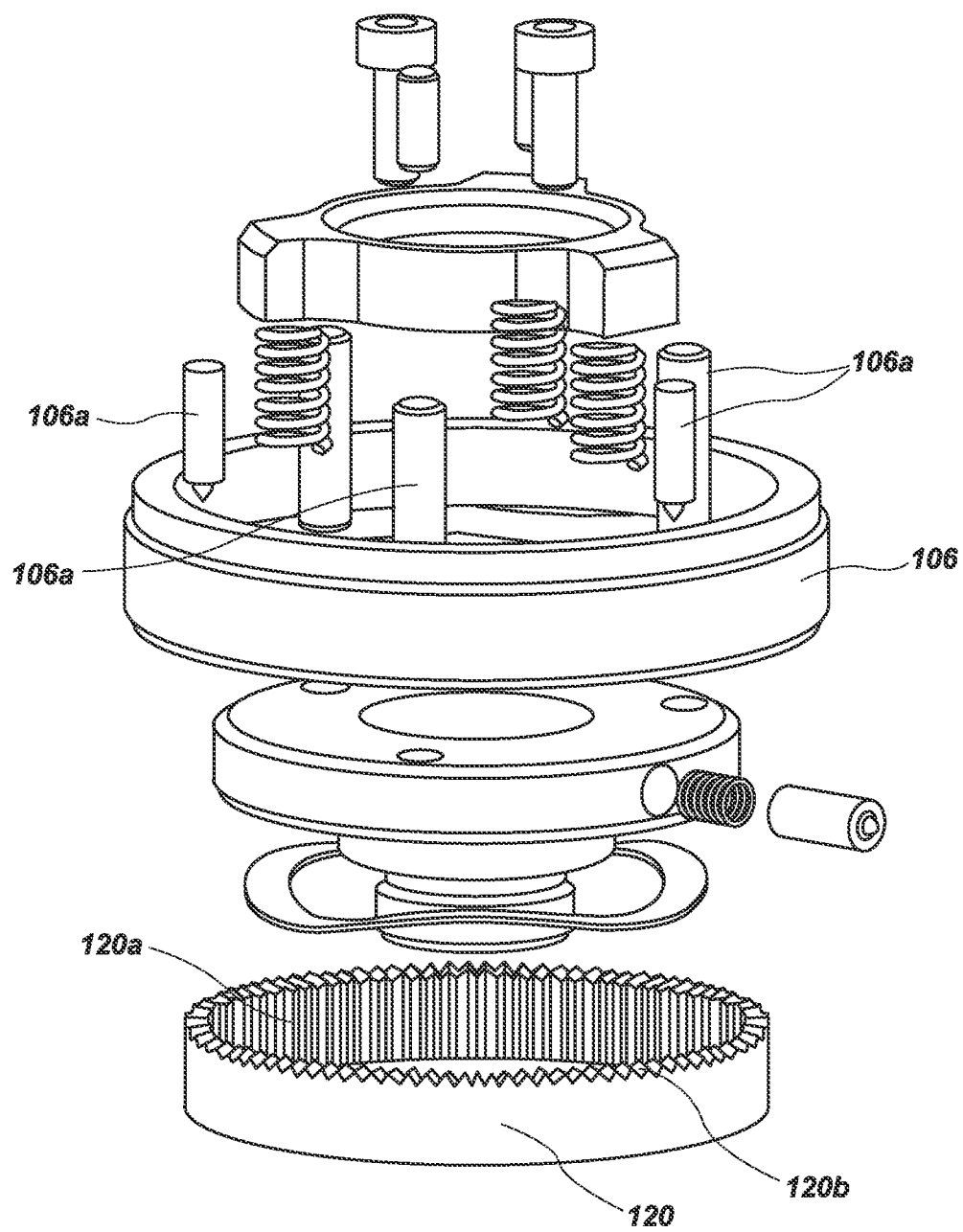
FIG. 20 illustrates an exploded view of an alternative turret according to an example of the present disclosure.

In other alternative configurations, the turret can comprise a stationary portion (e.g., detent ring 120) configured to remain stationary during actuation of the adjustment knob 101. The lock can include a protrusion disposed on one of the stationary portion (e.g., detent ring 120) or the adjustment knob 101 (e.g., the locking plate 108 coupled to the adjustment knob 101) and configured to engage with a groove formed on the other of the stationary portion or the adjustment knob to prevent movement of the adjustment knob in the plurality of adjustment directions. In the examples illustrated in FIGS. 3, 7, and 12-15, the teeth 108a correspond with the locking detents 120b in a one to one relationship. In an alternative to the detents 120a and 120b, along with the teeth 108a described above, the locking plate 106 can instead include protrusions that are fewer in number then the detents on the detent ring 102. For example, as illustrated in FIG. 19, the locking plate 408 includes fewer protrusions 408a than the plurality of locking detents 120b on the detent ring 120. As long as the protrusions 408a align with at least one locking detent 120b, the number of protrusions is not particularly limited in any way by this disclosure. Alternatively, the locking plate may include more protrusions than the number of detents on the detent ring. As long as the detent ring and locking plate mate together to prevent movement of one relative to the other, the number of protrusions or detents are not particularly limited.

Furthermore, the locking plate can be omitted and replaced by a plurality of locking pins 106a that are coupled to the spring mounted plate 106 and are configured to engage with the locking detents 120b on the detent ring. This configuration is shown in FIG. 19. Accordingly, a locking plate is not necessary as long as there are elements that engage with the detent ring to prevent rotation for the rotationally actuated components of the turret 100.

Figure 21A:
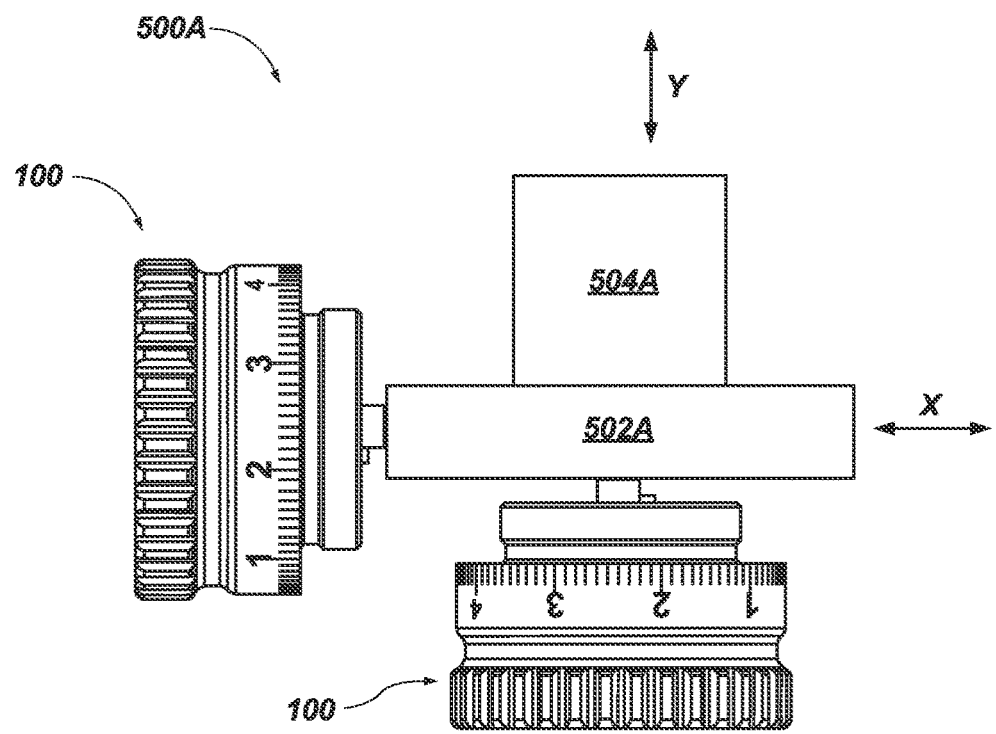
FIGS. 21a and 21b illustrate schematic views of position adjustment systems according to examples of the present disclosure.

FIG. 21a illustrates a schematic diagram of a position adjustment system 500A comprising turrets 100 coupled to an alignment stage 502A via contact pins 128. The turrets 100 can be operable to move the alignment stage 502A in one or more directions (e.g., X or Y directions). One or more devices 504A are mounted to the alignment stage 502A. The one or more devices 504A can be an optical scope, a laser site, a table top, a stage, or any other device requiring positional adjustment without limitation. The alignment stage 502A can be mounted to an alignment bench such as a firearm. Although the alignment stage 502A can be mounted to any alignment bench without limitation. The turrets 100 can be configured to adjust a position of the alignment stage and the mounted device relative to the alignment bench. The turret can be any turret according to the principles and examples described herein.

Figure 21B:
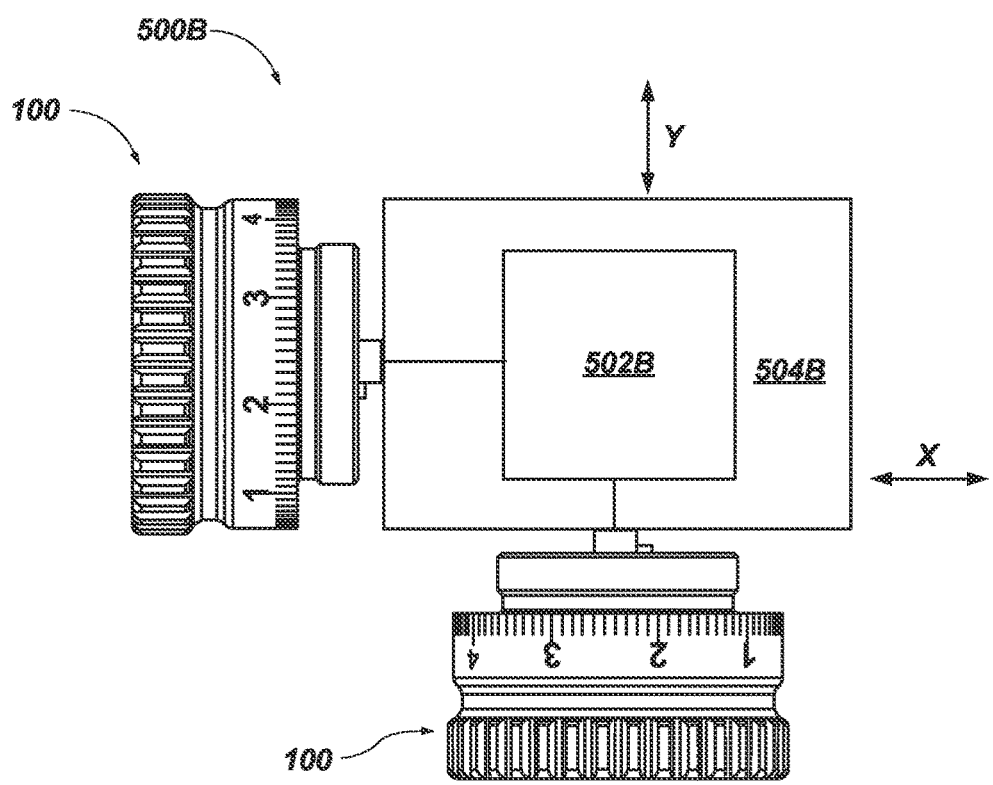

It is to be appreciated that, instead of moving an alignment stage 502A to which a device is mounted, the turrets 100 can instead move a reticle, lens, lens group, or other optical element within a scope instead of moving the scope or alignment stage themselves. For example, as illustrated in FIG. 21b, the turrets 100 can be coupled to an optical element or alignment stage 502B housed within a device 504B. The alignment stage 502B can comprise, for example, one or more of adjustable lenses, lens groups, stages, supports, reticles, or other adjustable members housed within a scope/device 504B. Accordingly, the scope may be fixedly mounted to an alignment bench such as a firearm and the turrets, instead of adjusting a position of the scope, can adjust optical, mechanical, and/or other elements within the scope 504B (or a stage coupled to said elements) in order to adjust and refine the aim and reference position of the scope 504B.

Described herein is a method 600 (shown in FIG. 22) of facilitating adjustment of a mounted device mounted to an alignment bench by adjusting an alignment stage that is moveable and associated with adjusting a position or aiming component of the mounted device. The method can include a step 601 of configuring the alignment stage to comprise a turret configured to adjust a position of the alignment stage. The method can include a step 602 of configuring the turret to comprise an adjustment knob configured to be actuatable in a plurality of adjustment directions to adjust the position of the alignment stage. The method can include a step 603 of configuring the turret to comprise a lock configured to prevent movement of the adjustment knob in the plurality of adjustment directions. The method can include a step 604 of facilitating adjustment of the alignment stage by configuring the adjustment knob to be actuatable to transition the adjustment knob between a locked state in which the lock is engaged and an unlocked state in which the lock is released. The method can include a step 605 of facilitating adjustment of the alignment stage by configuring the adjustment knob to be actuatable in the plurality of adjustment directions when the adjustment knob is in the unlocked state. The method can include a step 606 of configuring a biasing member to exert a biasing force on the adjustment knob to bias the adjustment knob to the locked state when the adjustment knob is released from the unlocked state.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein can be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics can be combined in any suitable manner in one or more examples. In the preceding description, numerous specific details were provided, such as examples of various configurations to provide a thorough understanding of examples of the described technology. It will be recognized, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A turret configured to adjust a position of an alignment stage coupled to the turret, the turret comprising:
   an adjustment knob configured to be actuatable in a plurality of adjustment directions to adjust the position of the alignment stage;
   a lock configured to prevent movement of the adjustment knob in the plurality of adjustment directions;
   wherein the adjustment knob is further configured to be actuatable to transition the adjustment knob between a locked state in which the lock is engaged and an unlocked state in which the lock is released wherein, with the adjustment knob in the unlocked state, the adjustment knob is actuatable in the plurality of adjustment directions; and
   a biasing member configured to exert a biasing force on the adjustment knob to bias the adjustment knob to the locked state when the adjustment knob is released from the unlocked state.

2. The turret of claim 1, further comprising:
   a stationary portion configured to remain stationary during actuation of the adjustment knob;
   wherein the lock comprises a brake disposed on one of the stationary portion or the adjustment knob and configured to engage with a braking surface disposed on the other of the stationary portion or the adjustment knob to prevent movement of the adjustment knob in the plurality of adjustment directions.

3. The turret of claim 1, further comprising:
   a stationary portion configured to remain stationary during actuation of the adjustment knob;
   wherein the lock comprises a protrusion disposed on one of the stationary portion or the adjustment knob and configured to engage with a groove formed on the other of the stationary portion or the adjustment knob to prevent movement of the adjustment knob in the plurality of adjustment directions.

4. The turret of claim 1, further comprising:
   a detent ring positioned to surround at least an inner portion of the adjustment knob and comprising a plurality of positioning detents formed on an inner radial surface of the detent ring;
   wherein the detent member is configured to remain stationary during actuation of the adjustment knob;
   wherein the adjustment knob comprises one or more spring-loaded detent plungers extending outward from the inner portion of the adjustment knob to engage with one or more of the plurality of positioning detents on the detent ring such that, during actuation of the adjustment knob in the plurality of adjustment directions, the one or more detent plungers sequentially engage with the plurality of positioning detents thereby providing a plurality of indexed positions for the adjustment knob.

5. The turret of claim 4, wherein the lock comprises a plurality of locking detents formed on a surface of the detent ring different from the inner radial surface, and one or more protrusions coupled to the adjustment knob each configured to engage with one or more of the plurality of locking detents formed on the detent ring to prevent movement of the adjustment knob in the plurality of adjustment directions.

6. The turret of claim 5, wherein in the locked state, the one or more detent plungers are engaged with the one or more of the plurality of positioning detents and the one or more protrusions are engaged with the plurality of locking detents, and wherein in the unlocked state, the one or more detent plungers are engaged with the one or more of the plurality of positioning detents and the one or more protrusions are disengaged with the plurality of locking detents allowing movement of the adjustment knob.

7. The turret of claim 1, wherein the plurality of adjustment directions are rotational directions about an axis of the adjustment knob.

8. The turret of claim 7, wherein, to transition the adjustment knob between the locked state and the unlocked state, the adjustment knob is actuatable in a translational direction along the axis of the adjustment knob.

9. A position adjustment system, comprising:
   an alignment bench;
   an adjustable alignment stage configured to adjust a position or aiming of one or more devices mounted to the alignment bench; and
   a turret configured to adjust the alignment stage, the turret comprising:
      an adjustment knob configured to be actuatable in a plurality of adjustment directions to adjust the position of the alignment stage;
      a lock configured to prevent movement of the adjustment knob in the plurality of adjustment directions;
      wherein the adjustment knob is further configured to be actuatable to transition the adjustment knob between a locked state in which the lock is engaged and an unlocked state in which the lock is released wherein, with the adjustment knob in the unlocked state, the adjustment knob is actuatable in the plurality of adjustment directions; and
      a biasing member configured to exert a biasing force on the adjustment knob to bias the adjustment knob to the locked state when the adjustment knob is released from the unlocked state.

10. The position adjustment system of claim 9, the turret further comprising:
    a stationary portion configured to remain stationary during actuation of the adjustment knob;
    wherein the lock comprises a brake disposed on one of the stationary portion or the adjustment knob and configured to engage with a braking surface disposed on the other of the stationary portion or the adjustment knob to prevent movement of the adjustment knob in the plurality of adjustment directions.

11. The position adjustment system of claim 9, the turret further comprising:
    a stationary portion configured to remain stationary during actuation of the adjustment knob;
    wherein the lock comprises a protrusion disposed on one of the stationary portion or the adjustment knob and configured to engage with a groove formed on the other of the stationary portion or the adjustment knob to prevent movement of the adjustment knob in the plurality of adjustment directions.

12. The position adjustment system of claim 9, the turret further comprising:
    a detent ring positioned to surround at least an inner portion of the adjustment knob and comprising a plurality of positioning detents formed on an inner radial surface of the detent ring;
    wherein the detent member is configured to remain stationary during actuation of the adjustment knob;
    wherein the adjustment knob comprises one or more spring-loaded detent plungers extending outward from the inner portion of the adjustment knob to engage with one or more of the plurality of positioning detents on the detent ring such that, during actuation of the adjustment knob in the plurality of adjustment directions, the one or more detent plungers sequentially engage with the plurality of positioning detents thereby providing a plurality of indexed positions for the adjustment knob.

13. The position adjustment system of claim 12, wherein the lock comprises a plurality of locking detents formed on a surface of the detent ring different from the inner radial surface and one or more protrusions coupled to the adjustment knob and each configured to engage with one or more of the plurality of locking detents formed on the detent ring to prevent movement of the adjustment knob in the plurality of adjustment directions.

14. The position adjustment system of claim 13, wherein in the locked state, the one or more detent plungers are engaged with the one or more of the plurality of positioning detents and the one or more protrusions are engaged with the plurality of locking detents, and
wherein in the unlocked state, the one or more detent plungers are engaged with the one or more of the plurality of positioning detents and the one or more protrusions are disengaged with the plurality of locking detents allowing movement of the adjustment knob plurality of adjustment directions.

15. The position adjustment system of claim 9, wherein the plurality of adjustment directions are rotational directions about an axis of the adjustment knob.

16. The position adjustment system of claim 15, wherein, to transition the adjustment knob between the locked state and the unlocked state, the adjustment knob is actuatable in a translational direction along the axis of the adjustment knob.

17. A method of facilitating adjustment of an alignment stage relative to an alignment bench, the method comprising:
- configuring the alignment stage to comprise a turret configured to adjust a position of the alignment stage;
- configuring the turret to comprise an adjustment knob configured to be actuatable in a plurality of adjustment directions to adjust the position of the alignment stage;
- configuring the turret to comprise a lock configured to prevent movement of the adjustment knob in the plurality of adjustment directions;
- facilitating adjustment of the alignment bench by configuring the adjustment knob to be actuatable to transition the adjustment knob between a locked state in which the lock is engaged and an unlocked state in which the lock is released;
- facilitating adjustment of the alignment stage by configuring the adjustment knob to be actuatable in the plurality of adjustment directions when the adjustment knob is in the unlocked state; and
- configuring a biasing member to exert a biasing force on the adjustment knob to bias the adjustment knob to the locked state when the adjustment knob is released from the unlocked state.

* * * * *